T. W. SCOTT & H. V. RUDOLPH.
ADJUSTABLE SUPPORT FOR CONTACT SHOES.
APPLICATION FILED NOV. 23, 1916.
1,229,184.
Patented June 5, 1917.
2 SHEETS—SHEET 1.
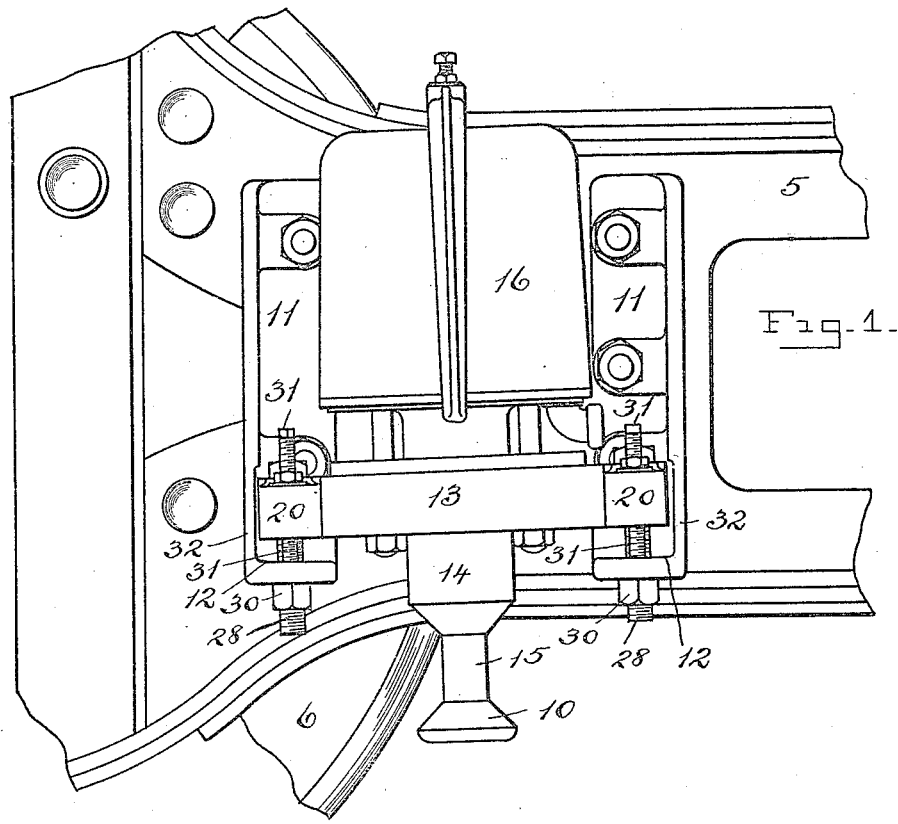
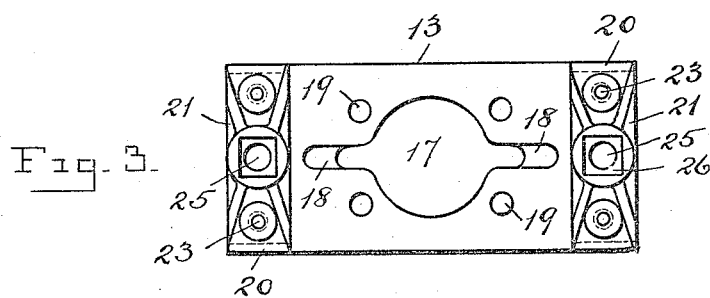
Inventors.
Thomas W. Scott
Harold V. Rudolph
By
Mann & Co.
Attorneys

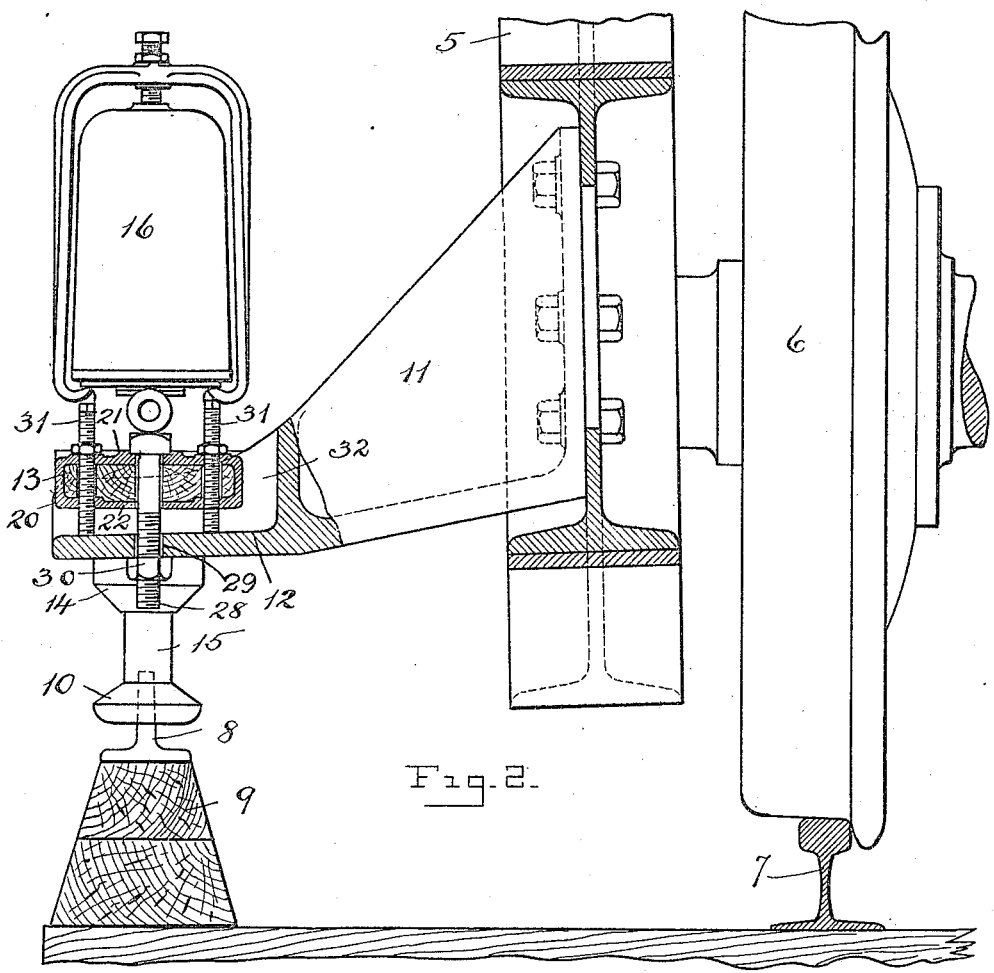
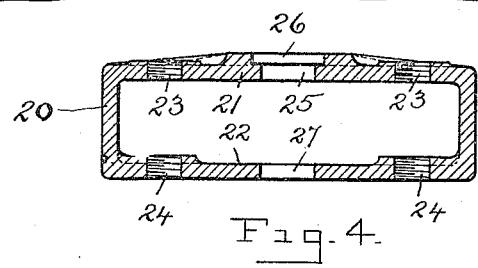

UNITED STATES PATENT OFFICE.

THOMAS W. SCOTT AND HAROLD V. RUDOLPH, OF BALTIMORE, MARYLAND, ASSIGNORS TO THE AMERICAN TRAIN CONTROL COMPANY, OF BALTIMORE, MARYLAND, A CORPORATION OF MARYLAND.

ADJUSTABLE SUPPORT FOR CONTACT-SHOES.

1,229,184.      Specification of Letters Patent.      Patented June 5, 1917.

Application filed November 23, 1916. Serial No. 133,053.

*To all whom it may concern:*

Be it known that we, THOMAS W. SCOTT and HAROLD V. RUDOLPH, citizens of the United States, residing at Baltimore city, in the State of Maryland, have invented certain new and useful Improvements in Adjustable Supports for Contact-Shoes, of which the following is a specification.

This invention relates to an adjustable shoe support for contact shoes of train stop and control mechanisms.

In practice considerable difficulty is experienced in maintaining the contact shoes on vehicles, that are equipped with automatic stop and control mechanisms, at the required height or pitch to most advantageously engage stationary ramp rails located at spaced apart intervals along the roadway. The difficulties arise because of wear on the wheels, which frequently is unlike and unequal on the several wheels of a vehicle truck, or because of crooked side frames or in some instances as the result of wear on brasses in the bearings.

As the ramp rails with which the shoes engage have a stationary, fixed relation and elevation with respect to the track rails, the contact shoes should be maintained in a position to effect a good contact therewith while passing the same.

The present invention therefore has for its object to provide an improved adjusting means for the contact shoe-supports whereby the shoe can be readily adjusted to an exact position and independently of the frame or wheels to effect the desired contact with the ramp rails.

This invention is illustrated in the accompanying drawing, wherein,—

Figure 1, shows a portion of a vehicle truck frame in side elevation with the improved adjustable shoe support carried at the side thereof.

Fig. 2, illustrates a cross-sectional detail through the same,—the section being taken on the line 2—2 of Fig. 1.

Fig. 3, shows the horizontal supporting beam and the adjusting frames at the ends thereof in top plan, and Fig. 4, illustrates a cross-sectional detail through one of the detached adjusting frames.

Referring to the drawing the numeral 5, designates the side frame of a vehicle truck; 6, a wheel; 7, one of the track rails and 8, a ramp rail sustained on a suitable support 9, at the side of the track rail and with which the contact shoe 10, on the vehicle is to engage as it is carried along at the side of the truck frame.

To the outer side of the truck frame 5, there are rigidly bolted two spaced-apart brackets 11, and each bracket has a horizontal ledge 12, at its outer end. In practice it is designed that the brackets be secured to the truck-frame so that the horizontal ledge 12, of one will be in accurate horizontal alinement with the ledge of the other bracket, but considerable difficulty is experienced in attaining the desired alinement.

The purpose of the ledges 12, is to provide a support for a horizontal beam 13, which latter carries the casing 14, for the shoe plunger 15, and also sustains the housing 16, in which the shoe contacts and switches are inclosed.

Inasmuch as the contact shoe and its coacting mechanisms are carried on the beam 13, an adjustment of those parts and the shoe can be readily effected by a proper adjustment of the beam itself, as this invention is designed to do. The beam 13, as shown in Fig. 3, is provided with a central opening 17; suitable side slots 18, and bolt openings 19, to receive the casing 14, the strengthening ribs thereon and the bolts by which the casing parts are held together.

The beam 13, has each end incased or bound by a metallic frame or casting 20, as illustrated best in Figs. 3 and 4, of the drawing, so that the top, bottom and two side surfaces of each end are entirely incased by the frame.

Each metallic frame or casing has upper and lower horizontal walls 21 and 22, and the upper wall 21, is provided with a plurality of screw-threaded perforations 23, which are directly above and in alinement with screw-threaded perforations 24, in the lower wall. In the present instance the upper wall 21, also has a central bolt perforation 25, with a recess 26 around the upper side thereof for the reception of a bolt-head, and the lower wall 22, has a perforation 27, through which the lower end of the securing bolt 28, may pass. Obviously, when the frame or casting is in place on the end of the beam 13, the latter will be provided with perforations to register with the several perforations in the frame so that the adjusting screws and securing bolts may be passed through the beam-end.

The beam 13, is of such length that its incased or framed ends will have position directly over the horizontal ledges 12, of the spaced brackets 11,—the metallic frames or castings being directly over said ledges. When in position, the bolt-holes 25 and 27, of the frame or casting will be in register with a bolt-hole 29, in the bracket ledge 12, so that the securing bolt 28, may extend down through the frame; the beam and bracket-ledge, and be held by a retaining nut 30, at the under side of said ledge, as clearly seen in Figs. 1 and 2 of the drawings.

Adjusting screws 31, extend vertically through the registering threaded perforations 23 and 24, and also through the beam, and the lower ends of these adjusting screws engage the upper side of the bracket ledges 12, at opposite sides of the securing bolt 28, as shown in Fig. 2.

It will be noted that the brackets 11, at the opposite ends of the beam 13, are provided with vertical flanges 32, so that the beam seats on the ledges 12, between the two flanges 32, which serve as end braces to brace the beam from shock in a longitudinal direction, as the shoe 10, rides up and onto a ramp rail. By means of these end braces, the bolts 28, are also relieved of the shocks caused by the shoe engaging a ramp rail.

From the foregoing explanation it will be understood that the horizontal beam 13, which carries the contact shoe and its operating and inclosed parts, is provided at its ends with metallic castings or frames 20, which latter have position directly over the horizontal ledges 12, of the supporting brackets 11. Each casting or frame 20, is provided with bolt-holes 25 and 27, through which a securing bolt 28, is freely passed and this securing bolt passes through a bolt-hole 29, in the bracket-ledge whereby to draw the metallic castings or frames 20, downward toward the ledge. In addition to the free securing bolt 28, each casting or frame is provided with a plurality of adjusting screws 31, which latter have threaded engagement with both the upper and lower walls of the casting or frame and the lower ends of these adjusting screws pass entirely through the lower wall of the casting or frame and contact with the upper surface of the ledge 12, on which they rest, as clearly seen in Figs. 1 and 2 of the drawings.

Obviously, if the nut 30, on the securing bolt 28, is loosened at the under side of the bracket ledge, the adjusting screws 31, may be rotated, and by such rotation, the casting or frame 20, elevated more or less with respect to the upper surface of the ledge 12, on which the ends of the adjusting screws rest. If the two adjusting screws are given the same number of rotations, then the space formed between the lower wall of the casting or frame and the upper surface of the ledge will be uniform, but if the ledge is not horizontal, by reason of the frame 5, or the bracket 11, being bent, or by reason of wear on the brasses or wheels, then the casting or frame, and the beam carried thereby can be adjusted to a horizontal position by an unequal adjustment of the screws 31, so that the plunger 15, and the shoe, 10, may be made to assume the desired position with respect to the ramp rails 8, to effect proper contact with the latter.

Having described our invention what we claim and desire to secure by United States Letters Patent is,—

1. In an adjustable support for vehicle contact shoes, the combination with bracket means having spaced apart ledges, of a beam extending between and over said ledges; a plurality of adjusting screws at each end of the beam with their lower ends seating on said bracket-ledges whereby to move the beam vertically with respect to the ledges, and securing bolts to draw the beam and adjusting screws toward the ledges.

2. In an adjustable support for vehicle contact shoes, the combination with bracket means having spaced apart ledges, of a beam extending between and having its opposite ends projecting over said bracket-ledges; a plurality of screws adjustably sustaining the said beam,—said screws being seated on said ledges and the beam being moved vertically with respect to and by the rotation of said screws, and means for holding the adjusting screw-ends down on said ledges.

3. In an adjustable support for vehicle contact shoes, the combination with bracket means having spaced apart ledges, of a beam extending between and having its opposite ends projecting over said bracket-ledges; metal frames around each end of the beam and directly over said ledges; adjusting screws having threaded engagement with the metal frames whereby the latter may travel vertically thereon,—said adjusting screws having their ends seated on the ledges of the brackets; and a securing bolt for drawing the metal frame toward the bracket ledges to hold the adjusting screws seated on said ledges.

4. In an adjustable support for vehicle contact shoes, the combination with bracket means having spaced apart ledges and each ledge having a flange at one side thereof, of a beam extending between the flanges on the spaced ledges and having its ends terminating over said ledges; adjusting means for moving the beam ends vertically between the said flanges and with respect to the said ledges; and securing bolts for holding the beam in the adjusted position between said flanges.

In testimony whereof we affix our signatures in the presence of two witnesses.

THOMAS W. SCOTT.
HAROLD V. RUDOLPH.

Witnesses:
CHAS. B. MANN,
IZELLA E. BAGLEY.

Copies of this patent may be obtained for five cents each, by addressing the "Commissioner of Patents, Washington, D. C."